March 5, 1957  R. S. DAVIS  2,783,883
EGG GRADING MACHINE
Filed Feb. 6, 1953  5 Sheets-Sheet 1

INVENTOR.
Roy S. Davis
BY Otis A. Earl
Attorney.

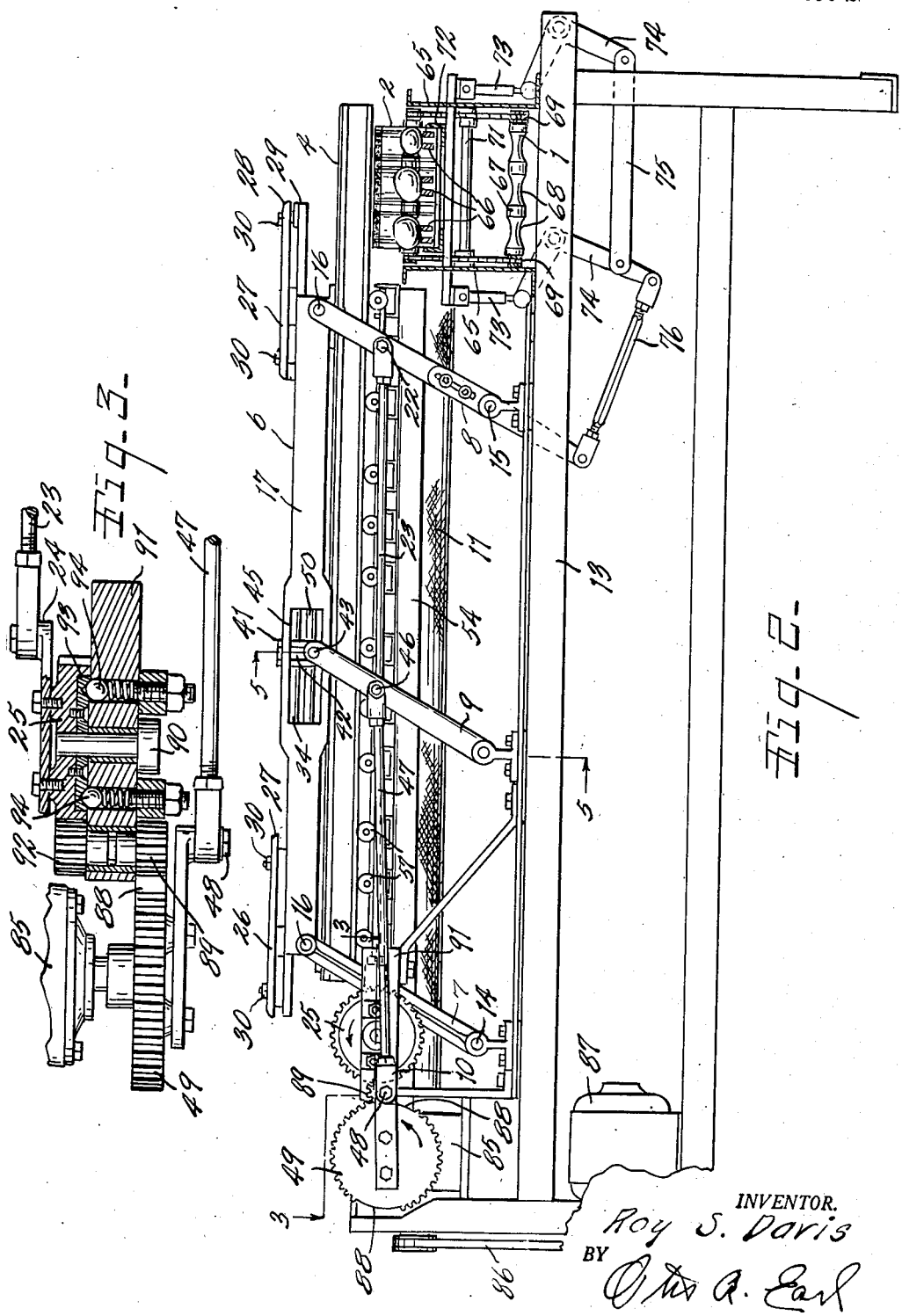

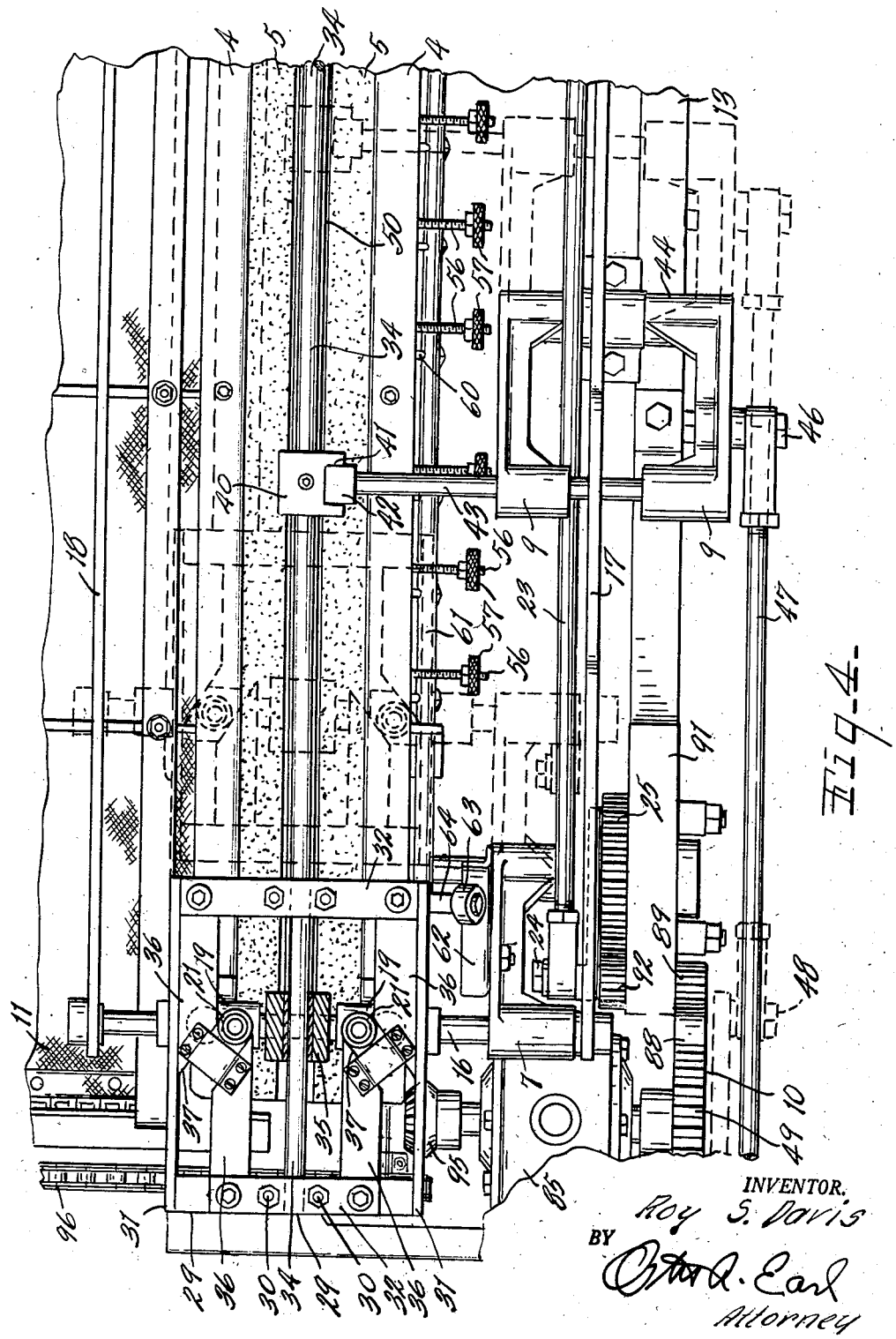

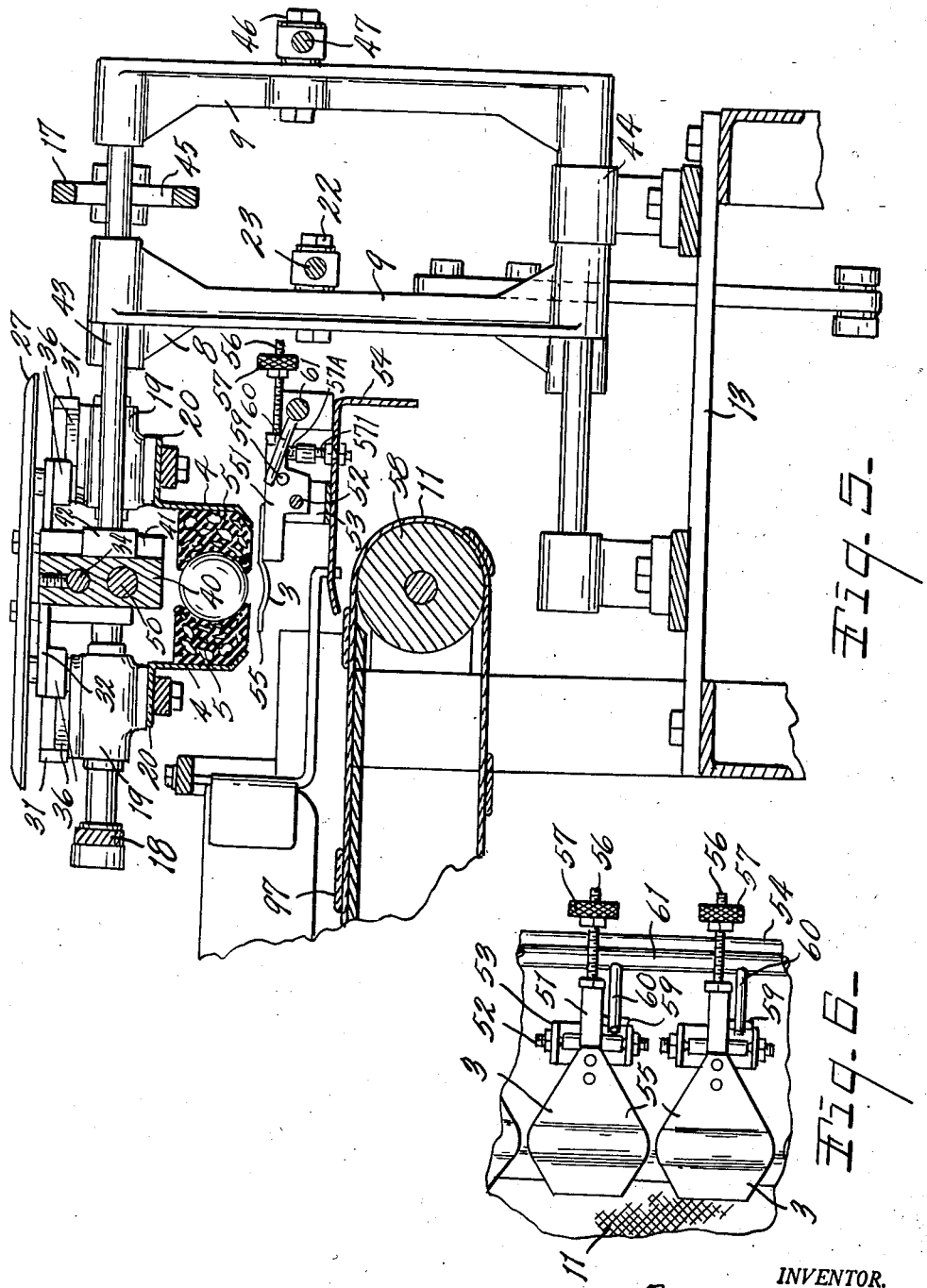

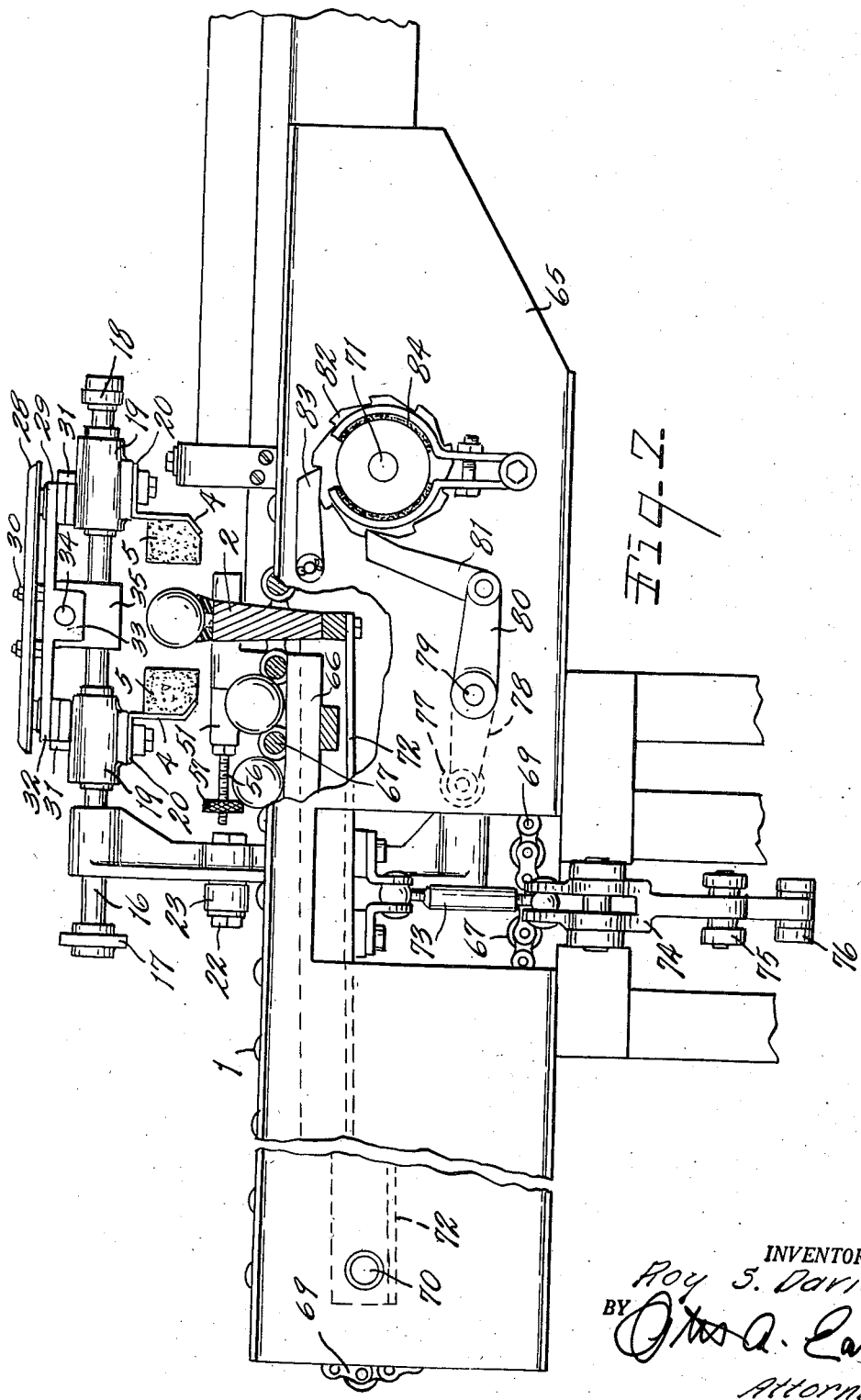

United States Patent Office 2,783,883
Patented Mar. 5, 1957

2,783,883

EGG GRADING MACHINE

Roy S. Davis, Otsego, Mich.

Application February 6, 1953, Serial No. 335,452

17 Claims. (Cl. 209—121)

This invention relates to improvements in egg grading machine.

The principal objects of this invention are:

First, to provide a novel supporting and driving mechanism for elongated egg gripping jaws that will oscillate the jaws longitudinally back and forth over a series of grading scales and transversely open and close jaws to pick up eggs from the scale pans and redeposit them in advance positions, all in smoothly operating manner so as not to damage the eggs.

Second, to provide a novel driving mechanism for an egg grading machine which will advance egg feeding conveyors in a step by step fashion and alternately raise and lower an elevator element for lifting eggs from the plane of the conveyors in timed relationship with eggs advancing jaws that are reciprocated longitudinally along the elevator and a series of grading scales to advance eggs from the elevator along the series of scales.

Third, to provide a novel driving mechanism of intermittently oscillating a jaw supporting carriage on an egg machine and for oscillating a jaw closing lever independently of the carriage during dwell periods in the operation of the carriage and thereafter oscillating the jaw actuating rod concurrently and at the same rate as the carriage and to further provide means for positively locating the stopping points of the carriage.

Fourth, to provide an egg grading machine with smoothly and rapidly oscillatable transfer jaws in combination with a series of quick unloading sensitive scales that positively eject eggs that overbalance the scales.

Other objects and advantages of the invention will be apparent from a consideration of the following description and claims. The drawings of which there are five sheets illustrate a highly practical form of the grading machine.

Fig. 2 is a front elevational view of the machine shown in Fig. 1.

Fig. 3 is a fragmentary enlarged horizontal cross sectional view through the driving connection to the carriage actuating mechanism taken along the plane of the line 3—3 in Fig. 2.

Fig. 4 is an enlarged fragmentary plane view of one end of the machine illustrating the primary driving connections thereto.

Fig. 5 is a fragmentary transverse cross sectional view through the machine taken along the plane of the line 5—5 in Figs. 1 and 2.

Fig. 6 is a fragmentary enlarged plane view of two of the grading scales of the machine.

Fig. 7 is a fragmentary end elevational view illustrating the relation of the infeeding conveyor to the remainder of the machine. Portions of the infeeding conveyor and elevator are broken away and shown in cross section.

Figure 1:
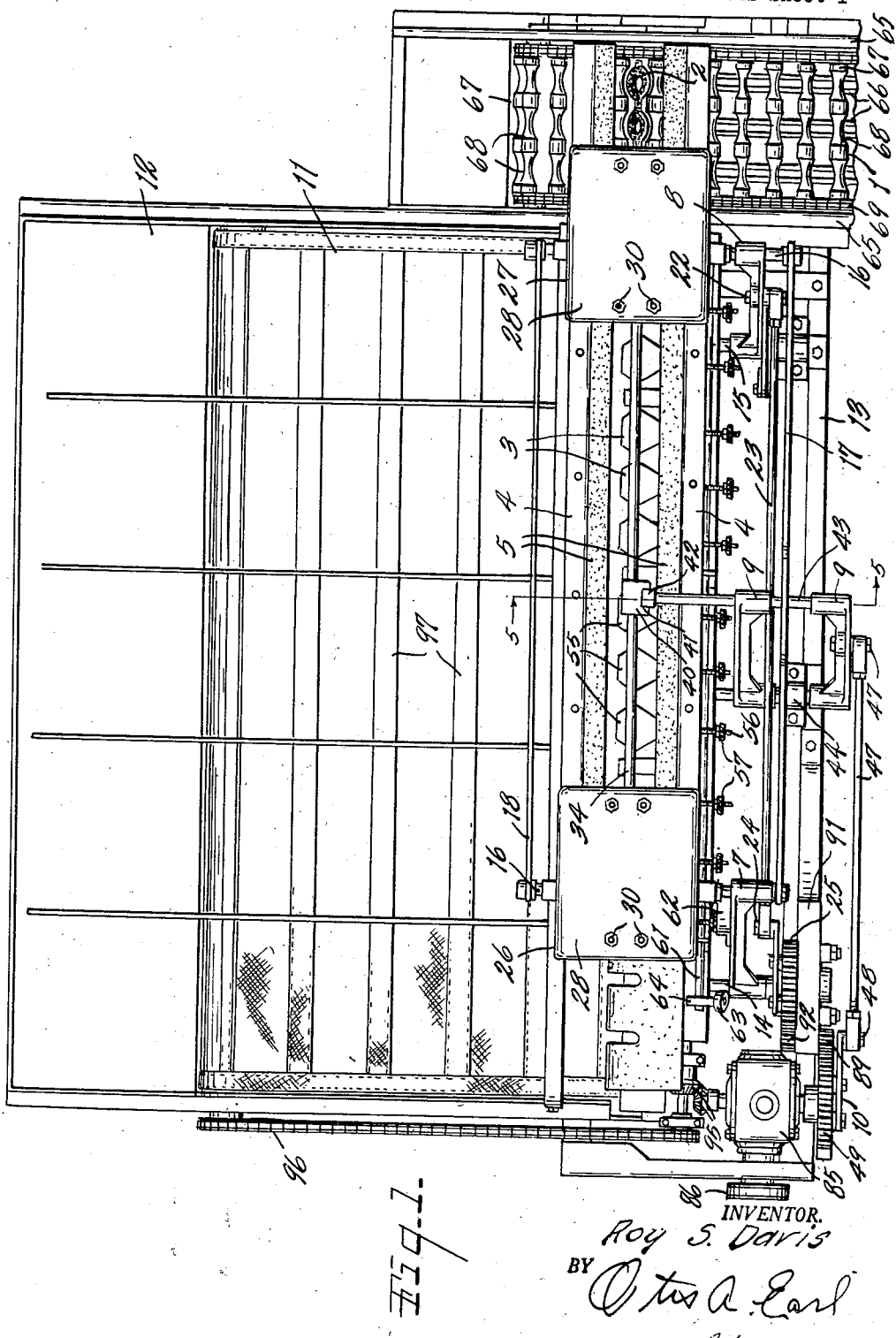
Fig. 1 is a top plane view of the machine with a portion of the infeeding conveyor broken away.

The machine disclosed herein is primarily adapted for grading and sorting eggs by weight but it will be understood that the machine might be used for sorting other objects and grading them according to various physical properties. As is most clearly illustrated in Fig. 1 the machine consists generally of an infeeding conveyor 1 which delivers eggs to an elevator 2. The elevator is aligned with a series of weighing scales 3 which form the grading elements of the present invention. The eggs are advanced from the elevator 2 to the scales and along the line of scales by a pair of longitudinally extending and elongated jaws 4 having soft sponge rubber faces 5. The jaws are longitudinally oscillatively supported on a carriage generally indicated at 6 and are transversely movable in opening and closing motion on the carriage as will be described in greater detail presently. The carriage 6 is oscillatively supported on swingable arms 7 and 8 positioned near each end of the carriage while jaw actuating arms 9 pivotally mounted between the arms 7 and 8 are adapted to actuate the jaw opening and closing mechanism. The driving connections to the arms 7, 8 and 9 are indicated generally at 10 and an off-feeding continuous belt conveyor 11 has a trailing end positioned to receive eggs discharged by the scales 3. The conveyor 11 delivers to a loading table 12 from which the graded eggs may be packed in cartons as desired. The entire machine is supported upon a suitable frame work elements of which are indicated by the reference numeral 13. It will be appreciated that the details of the frame work construction are relatively unimportant to the present invention.

*Jaw supporting carriage*

The jaw supporting carriage 6 includes the previously mentioned arms 7 and 8 which are pivotally supported on the frame work 13 at 14 and 15 respectively. The upper swinging ends of the arms 7 and 8 carry laterally projecting circular rods 16 that are connected on the front side of the machine by a tie-rod 17 and at the rear side of the machine by a similar tie-rod 18. As is most particularly illustrated in Fig. 7 the rods 16 each carry two slidable collars 19 with downwardly projecting angled clips 20 on the underside thereof. The clips 20 form the backing or body elements of the previously described jaws 4 and support the sponge rubber facing 5. The upper sides of the collars 19 carry upwardly projecting rollers 21 that coact with the jaw actuating mechanism as will be described. The carriage supporting arm 8 is connected as at 22 to a connecting rod 23. The rod 23 is connected to a crank pin 24 on the carriage operating gear 25. Rotation of the gear 25 obviously oscillates the arm 8 and through the arm 8 the entire carriage and the jaws carried thereby.

*Jaw opening and closing mechanism*

The mechanism for opening and closing the jaws 4 comprises a rectangular head structure 26 at the left end of the carriage and a similar head structure 27 at the right end of the carriage. The heads 26 and 27 each include a cover plate 28 secured over a rectangular frame 29 by bolts 30. The frames 29 include longitudinal side pieces 31 connected by cross pieces 32. The cross pieces 32 carry depending bosses 33 (see Fig. 7) to which a longitudinally extending actuating rod 34 is secured. At each head 26 the actuating rod 34 extends slidably and longitudinally through a block 35 secured to the cross rod 16 associated with the head. The actuating rod 34 and the blocks 35 thus tie the heads 26 to the carriage while permitting the actuating rod and heads to move longitudinally with respect to the carriage.

Secured to the frames 29 of the heads 26 and 27 are cam slot forming plates 36 which form cam slots 37 on each side of the head with the cam slots diverging outwardly toward the left ends of the head as viewed in Figs. 1 and 4. The cam slots 37 are positioned to receive the previously described rollers 21 projecting upwardly from the slide blocks 19 that support the egg handling jaws.

Intermediate of its ends the actuating rod 34 is provided with a block 40 rigidly secured to the actuating rod. One side of the block 40 is vertically grooved to provide a slideway 41 for the drive block 42. The block 42 is secured to the end of a drive rod 43 oscillatively carried by the upper ends of the jaw actuating arms 9. The arms 9 are pivotally supported from the framework of the machine as at 44. Obviously oscillation of the arms 9 and the rod 43 while the carriage and jaws 4 remain longitudinally stationary will cause the frames 29 and cam slots 37 of the heads 26 and 27 to move longitudinally with respect to the jaws. The rollers 21 which are secured to the jaw supporting blocks 19 will therefore move transversely through the cam slots 37 to open or close the jaws on the rods 16.

The front side rail 17 of the carriage is slotted as at 45 intermediate of its ends to pass the jaw actuating rod 43. The forward arm 9 is pivotally connected as at 46 to a jaw actuating connecting rod 47. The connecting rod 47 is connected at its other end to a crank pin 48 carried on the gear 49. The slide block 40 is held erect on the actuating rod 34 by slidably embracing a tie rod 50. The ends of the tie rod 50 are secured to and further tie together the blocks 35 on the cross rod 16 of the carriage.

The scale structure

The grading scales each include a scale beam 51 pivotally supported at 52 on brackets 53 secured to a longitudinally extending rail 54 of the framework of the machine. As is best illustrated in Fig. 5, the scale pan 55 projects to the left from each scale beam and a threaded counterweight pin 56 carries an adjustable counterweight and lock nut 57. Eggs that are deposited on any particular scale pan and which overbalance the adjusted counterweight 57 cause the scale beam and pan to tilt downwardly and deliver the egg to the continuous belt conveyor 11 having its forward end looped around a roller 58. It will be noted that the pivot 52 is located substantially below the line between the pan 55 and weight 57 so that the scale is unstable and once over balanced will quickly tilt to discharge the egg which over balances it. A soft felt bumper 57A mounted on the top of an adjusting screw 571 supports the counterweighted end of the scale beam to prevent opposite over balance of the unstable beam.

Each scale beam 51 carries a projecting pin 59 that is engaged by a coacting damper rod 60. The rods 60 project from and are secured to a damper shaft 61. When the damper shaft 61 is oscillated the damper arms 60 engage the pins 59 to hold the scale beams and pans in inactive elevated position to receive eggs from the jaws 4. The damper shaft 61 is oscillated by engagement of a flange 62 on the carriage supporting arm 7 with a roller 63. The roller 63 is mounted on an arm 64 projecting from the inner end of the damper shaft (see Figs. 1 and 4). Thus as the carriage 6 and heads 26 and 27 are oscillated to the left by the arm 7, the angle 62 will actuate the damper rods 59 to dampen the scale beams during the time that eggs are being deposited on the scale pans.

Infeed conveyor and elevator

The infeed conveyor 1 and elevator 2 which deliver eggs into alignment with the scale pans 55 are mounted between two upright plates 65 secured to the right end of the framework 13. Three sets of parallel rails 66 are positioned longitudinally between the plates 65 and just below the upper edges thereof to slidingly support three lines of eggs. The eggs are advanced along the rails 66 in sets of three by transversely extending flight rods 67 having concave notches 68 therein. The flight rods are connected at their ends to conveyor chains 69 and chains are trained around suitable sprockets rotatably supported on cross shafts 70 and 71 (see Fig. 7). The sprockets on the shaft 70 are idler sprockets but the sprockets on the shaft 71 are drive sprockets and are secured to the shaft 71.

The elevator 2 is supported on the swinging end of a lever 72 disposed underneath the rails 66 and pivotally supported at its front end of the shaft 70. The elevator is vertically reciprocated to pass between the successive flight rods 67 by depending links 73 (see Fig. 2) secured at their lower ends to cranks 74. The cranks 74 are tied together for simultaneous operation by a link 75 and one of the cranks is connected by the link 76 to the lower end of the carriage supporting arm 8. Thus as the carriage 6 and jaws 4 are retracted to the right to position them over the elevator 2, the cranks 74 operate to raise the elevator 2.

The infeed conveyor 1 is advanced in step by step manner by engagement of the elevator lever 72 with a roller 77 (see Fig. 7) on a lever 78 secured to the rock shaft 79. At its outer end, the rock shaft 79 carries an arm 80 to which the pawl 81 is pivotally attached. The pawl 81 coacts with a ratchet wheel 82 on the end of the shaft 71 to advance the infeed conveyor with each actuation of the elevator. A lock pawl 83 prevents backward travel of the infeed conveyor while a brake structure 84 prevents over-travel of the conveyor.

Drive connections to carriage and jaws

As was previously pointed out, the carriage 6 and jaws 4 are longitudinally reciprocated by rotation of the carriage drive gear 25. The jaw actuating lever is independently driven by the jaw actuating gear 49. With particular reference to Figs. 1, 2 and 3 it is pointed out that the gear 49 is continuously driven through a gear box 85 and belt 86 from the motor 87. The gear 49 constantly rotates in the direction indicated by the arrow in Fig. 2 and is provided on diametrically opposite sides with interrupted or untoothed portions 88. The tooth portions of the gear 49 mesh with and drive the pinion 89 but the rotation of the pinion will obviously be interrupted twice in each rotation of the gear 49.

The gear 25 is rotatably mounted on a pin 90 carried by a bearing plate 91. The gear 25 is continuously in mesh with and driven by an inner pinion 92 that is connected to the pinion 89. Thus the gear 25 is driven in the direction indicated by the arrow in Fig. 2 except when the interrupted portions 88 of the gear 49 are passing the pinion 89. In order to prevent over-travel or uncontrolled rotation of the gear 25, a detent plate 93 is secured to the gear and provided with locating sockets that coact with spring pressed ball detents 94. Each section of the teeth on the gear 49 contains a number of teeth equal to half the teeth on the gear 25 so that the gears 25 and 49 operate at the same R. P. M. but with the gear 25 stopping twice in each rotation.

The off-feed conveyor belt 11 is driven from the gear box 85 by the bevelled pinions 95 and chain 96 and is driven at such a speed that a raised pacer flight bar 97 is advanced underneath the scale pans with each cycle of the remainder of the machine.

Cycle of operation

With the machine in the position shown in Fig. 2 in which the carriage 6 and jaws 4 are retracted over the raised elevator 2, continued rotation of the jaw actuating gear 49 will advance the connecting rod 47 and jaw actuating arms 9 to advance the heads 26 and 27 while the gear 25 and carriage 6 remain stationary due to one of the interrupted portions of the gear 49 passing the pinion 89. This movement moves the cam slots 37 in the heads relative to the rollers 21 to cam the rollers and the jaws 4 inwardly into gripping engagement with the eggs on the elevator. As the gear 49 and arms 9 continue to advance, one toothed portion of the gear 49 picks up the pinion 89 and gear 25 to simultaneously advance the arms 7 and 8 and the carriage 6 longitudinally over the scale pans. At the completion of the advancing motion of the carriage, the ball detents 94 engage the gear 25 to hold the carriage in proper position while the second interrupted portion of the gear 49 permits the gear 49 to continue to rotate and start the connecting rod 48 and jaw actuating arms 9 on their retracting stroke. This latter motion of the arms 49 again moves the heads 26 and 27 and the cam slots 37 with respect to the rollers 21 to open the jaws 4 and deposit all eggs in advanced positions along the line of scale pans 55. Once the jaws 4 are open, the carriage starts a retracting stroke by further engagement of the gear 49 with the pinion 89 and gear 25.

It is pointed out that at no time are the eggs handled by the machine subjected to sudden movement or shock so that the machine can operate rapidly without danger of breaking the eggs. The temporary locking engagement between the ball detents 94 and the gear 25 assures that the jaws 4 will be completely opened and closed prior to the jaws starting their longitudinal travel in either direction.

Having thus described my invention, what I claim as new and desire to secure by Letter Patent, is:

1. In an egg grading machine having a series of scales having their pans disposed in alignment, an infeed conveyor having flights disposed parallel to the line of scale pans and adapted to advance a plurality of eggs into alignment with said pans, an elevator reciprocable through said flights to elevate a plurality of eggs from said conveyor to approximately the level of said pans and in alignment therewith, a carriage movably supported over said pans, parallel arms swingably supporting said carriage, transversely movable longitudinally elongated jaws carried by said carriage, an actuating rod slidably carried by said carriage and movable longitudinally with respect thereto, means forming cam slots connected to said actuating rod and engageable with said jaws to move said jaws transversely with respect to said carriage, a third arm having a fixed pivot at one end and having its other end drivingly connected to said actuating rod, a first crank gear and connecting rod connected to said third arm to continuously oscillate the same, a second gear and connecting rod connected to oscillate said parallel arms, a pinion drivingly engaged between said crank gears, said first crank gear having opposed interrupted toothed portions, means for driving said first gear, lever means connected between one of said first arms and said elevator to actuate said elevator, and lever and ratchet means connected between said elevator and said infeed conveyor adapted to advance said infeed conveyor in step by step fashion upon each oscillation of said carriage and elevator.

2. In an egg grading machine having a series of scales having their pans disposed in alignment, an infeed conveyor having flights disposed parallel to the line of scale pans and adapted to advance a plurality of eggs into alignment with said pans, an elevator reciprocable through said flights to elevate a plurality of eggs from said conveyor to approximately the level of said pans and in alignment therewith, a carriage movably supported over said pans, parallel arms swingably supporting said carriage, transversely movable longitudinally elongated jaws carried by said carriage, an actuating rod slidably carried by said carriage and movable longitudinally with respect thereto, means forming cam slots connected to said actuating rod and engageable with said jaws to move said jaws transversely with respect to said carriage, a third arm having a fixed pivot at one end and having its other end drivingly connected to said actuating rod, a first crank gear and connecting rod connected to said third arm to continuously oscillate the same, a second gear and connecting rod connected to oscillate said parallel arms, a pinion drivingly engaged between said crank gears, said first crank gear having opposed interrupted toothed portions, means for driving said first gear, means connected between one of said first arms and said elevator to actuate said elevator, and means connected between said elevator and said infeed conveyor adapted to advance said infeed conveyor in step by step fashion upon each oscillation of said carriage and elevator.

3. In an egg grading machine having a series of scales having their pans disposed in alignment, an infeed conveyor having flights disposed parallel to the line of pans and adapted to advance a plurality of eggs into alignment with said pans, an elevator reciprocable through said flights to elevate a plurality of eggs from said conveyor to approximately the level of said pans and in alignment therewith, a carriage movably supported over said pans, spaced arms swingably supporting said carriage, longitudinally elongated jaws carried by said carriage and transversely slidable thereon, an actuating rod slidably carried by said carriage and movable longitudinally with respect thereto, means forming cam slots connected to said actuating rod and engageable with said jaws to move said jaws transversely with respect to said carriage, a third arm having a fixed pivot at one end and having its other end drivingly connected to said actuating rod, a first crank gear and connecting rod connected to said third arm to oscillate the same, a second gear and connecting rod connected to oscillate said spaced arms, a pinion drivingly engaged between said crank gears, said first crank gear having opposed interrupted toothed portions adapted to interrupt the drive to said spaced arms at the ends of the throw thereof, means for driving said first gear, and means connected between one of said spaced arms and said elevator and said infeed conveyor adapted to reciprocate said elevator and advance said infeed conveyor in step by step fashion upon each oscillation of said carriage.

4. In an egg grading machine having a series of scales having their pans disposed in alignment, an infeed conveyor having flights disposed parallel to the line of pans and adapted to advance a plurality of eggs into alignment with said pans, an elevator reciprocable through said flights to elevate a plurality of eggs from said conveyor to approximately the level of said pans and in alignment therewith, a carriage movably supported over said pans, spaced arms swingably supporting said carriage, longitudinally elongated jaws carried by said carriage and transversely slidable thereon, an actuating rod slidably carried by said carriage and movable longitudinally with respect thereto, means forming cam slots connected to said actuating rod and engageable with said jaws to move said jaws transversely with respect to said carriage, a first crank gear and connecting rod connected to said actuating rod to oscillate the same, a second gear and connecting rod connected to oscillate said spaced arms, a pinion drivingly engaged between said crank gears, said first gear having opposed interrupted toothed portions adapted to interrupt the drive to said spaced arms at the ends of the throw thereof, means for driving said first gear, and means connected between one of said spaced arms and said elevator and said infeed conveyor adapted to reciprocate said elevator and advance said infeed conveyor in step by step fashion upon each oscillation of said carriage.

5. Apparatus for translating objects along a series of aligned supports comprising, spaced arms pivotally supported alongside said supports and extending thereabove, cross rods projecting from the upper ends of said arms across said supports, tie rods connecting said cross rods, a pair of slide blocks transversely slidably mounted on each cross rod and having rollers projecting from their upper sides, a pair of elongated jaws having opposed resilient faces secured to the undersides of said slide blocks over said supports, guide blocks carried by said cross rods between said slide blocks, an actuating rod slidably supported by said guide blocks, a head structure connected to each end of said actuating rod, said head structures defining divergent cam slots drivingly receiving the projecting rollers on said slide blocks, a third arm pivotally supported alongside said supports and extending upwardly to opposite said actuating rod, means including a third cross rod extending from said third arm and drivingly connecting said third arm to said actuating rod, a first drive gear having a crank pin and connecting rod drivingly associated therewith and connected to said third arm, said first gear having interrupted teeth thereon, a pinion drivingly engageable with the teeth on said first gear, a second driving gear having a second crank pin and connecting rod associated therewith and drivingly connected to said spaced arms, said second driving gear having continuous driving engagement with said pinion, and means for continuously rotating said first gear.

6. Apparatus for translating objects along a series of aligned supports comprising, spaced arms pivotally supported alongside said supports and extending thereabove, cross rods projecting from the upper ends of said arms across said supports, a tie rod connecting said cross rods, a pair of slide blocks transversely slidably mounted on each cross rod and having projections on their upper sides, a pair of elongated jaws having opposed resilient faces secured to the underside of said slide blocks over said supports, guide blocks carried by said cross rods between said slide blocks, an actuating rod slidably supported by said guide blocks, a head structure connected to each end of said actuating rod, said head structures defining divergent cam slots drivingly receiving the projections on said slide blocks, a third arm pivotally supported alongside said supports and extending upwardly to opposite said actuating rod, means drivingly connecting said third arm to said actuating rod, a first drive gear having a crank pin and connecting rod drivingly associated therewith and connected to said third arm, said first gear having interrupted teeth thereon, a pinion drivingly engageable with the teeth on said first gear, a second driving gear having a second crank pin and connecting rod associated therewith and drivingly connected to said spaced arms, said second driving gear having continuous driving engagement with said pinion, and means for continuously rotating said first gear.

7. Apparatus for translating objects along a series of aligned supports comprising, spaced arms pivotally supported alongside said supports and extending thereabove, cross rods projecting from the upper ends of said arms across said supports, a tie rod connecting said cross rods, a pair of elongated jaws having opposed resilient faces carried on the undersides of said cross rods over said supports, one of said jaws being carried by blocks slidably mounted on said cross rods and having projections thereon, guide blocks carried by said cross rods, an actuating rod slidably supported by said guide blocks, a head structure connected to each end of said actuating rod, said head structures defining cam slots drivingly receiving the projections on said blocks to shift said one jaw transversely with respect to the other jaw, a first drive gear having a crank pin and connecting rod associated therewith and drivingly connected to said actuating rod, a pinion drivingly engageable with said first gear, a second driving gear having a second crank pin and connecting rod associated therewith and drivingly connected to said spaced arms, said second driving gear having driving connection with said pinion, and means for rotating said first gear, said first gear having an interrupted portion in its teeth adapted to interrupt the drive to said spaced arms at the ends of the throw thereof.

8. In combination with an egg grading machine having an infeeding conveyor and a pair of elongated jaws oscillatable transversely of said conveyor to receive and translate eggs therefrom, an elevator vertically reciprocable between the flight of said conveyor and below said jaws to present eggs to said jaws, an arm connected to guide the oscillation of said jaws, crank and connecting link means connected between said arm and said elevator to reciprocate said elevator with said arm, a ratchet wheel connected to said conveyor to advance the same, a lever having a pawl drivingly engageable with said ratchet wheel, said lever having a portion disposed in the path of said elevator to be actuated thereby, and means preventing reverse rotations of said wheel.

9. In combination with an egg grading machine having an infeeding conveyor and a pair of elongated jaws oscillatable over said conveyor to receive and translate eggs therefrom, an elevator vertically reciprocable between the flights of said conveyor and below said jaws to present eggs to said jaws, an arm connected to guide the oscillation of said jaws, means connected between said arm and said elevator to reciprocate said elevator with said arm, a ratchet wheel connected to said conveyor to advance the same, a lever having a pawl drivingly engageable with said ratchet wheel, said lever having a portion disposed in the path of said elevator to be actuated thereby, and means preventing reverse rotation of said wheel.

10. In combination with an egg grading machine having an infeeding conveyor and a pair of elongated jaws oscillatable over said conveyor to receive and translate eggs therefrom, an elevator vertically reciprocable between the flights of said conveyor and below said jaws to advance a group of eggs from said conveyor to said jaws, an arm connected to guide the oscillation of said jaws, means connected between said arm and elevator to reciprocate said elevator with said arm, and means connected between said conveyor and said elevator to advance the conveyor upon each actuation of the elevator.

11. Apparatus for translating objects along a series of aligned supports comprising, spaced arms pivotally supported alongside said supports and extending thereabove, cross rods projecting from the upper ends of said arms across said supports, a tie rod connecting said cross rods, a pair of slide blocks transversely slidably mounted on each cross rod and having projections on their upper sides, a pair of elongated jaws having opposed resilient faces secured to the undersides of said slide blocks over said supports, guide blocks carried by said cross rods, an actuating rod slidably supported by said guide blocks, a head structure connected to each end of said actuating rod, said head structures defining transversely divergent cam slots drivingly receiving the projections on said slide blocks, a first drive gear having an interrupted portion in the teeth thereon and drivingly connected to said actuating rod, a pinion drivingly engageable with the teeth on said first gear, a second driving gear drivingly connected to said spaced arms, said second driving gear having continuous driving engagement with said pinion, means for rotating said first gear, and a spring pressed detent engageable with said second gear in the rotated position of said second gear corresponding to the registration of said pinion with the interrupted portion of the teeth on said first gear.

12. In an egg grading machine having a series of scales having their pans disposed in alignment, an infeed conveyor having flights adapted to advance a plurality of eggs into alignment with said pans, an elevator reciprocable through said flights to elevate a plurality of eggs from said conveyor to approximately the level of said pans and in alignment therewith, a carriage movably supported over said pans, spaced arms swingably supporting said carriage, longitudinally elongated jaws carried by said carriage and transversely movable thereon, an actuating rod slidably carried by said carriage and movable longitudinally with respect thereto, means forming cam slots connected to said actuating rod and engageable with said jaws to move said jaws transversely with respect to said carriage, a third arm having a fixed pivot at one end having its other end drivingly connected to said actuating rod, a first crank gear and connecting rod connected to said third arm to continuously oscillate the same, a second gear and connecting rod connected to oscillate said spaced arms, a pinion drivingly engaged between said crank gears, said first crank gear having opposed interrupted toothed portions, means for driving said first gear, and a spring pressed detent engageable with said second gear to restrain rotation thereof while said pinion is in registry with the interrupted portions of said first gear and at the ends of the throw of said spaced arms.

13. In an egg grading machine having a series of scales having their pans disposed in alignment, an infeed conveyor having flights adapted to advance a plurality of eggs into alignment with said pans, an elevator reciprocable through said flights to elevate a plurality of eggs from said conveyor to approximately the level of said pans and in alignment therewith, a carriage movably supported over said pans, spaced arms swingably supporting said carriage, longitudinally elongated jaws carried by said carriage and transversely movable thereon, an actuating rod slidably carried by said carriage and movable longitudinally with respect thereto, means connected to said actuating rod and engageable with said jaws to move said jaws transversely with respect to said carriage, a third arm having a fixed pivot at one end having its other end drivingly connected to said actuating rod, a first crank gear and connecting rod connected to said third arm to continuously oscillate the same, a second gear and connecting rod connected to oscillate said spaced arms, a pinion drivingly engaged between said crank gears, said first crank gear having an interrupted toothed portion, means for driving said first gear, and a spring pressed detent engageable with said second gear to restrain rotation thereof while said pinion is in registry with the interrupted portion of said first gear and at the ends of the throw of said spaced arms.

14. In a grading machine having a series of grading station supports disposed in equally spaced alignment, a carriage mounted to reciprocate longitudinally over said supports, coacting jaws carried by said carriage and disposed longitudinally therealong to register with said supports at the ends of the throw of said carriage, said jaws being movable with respect to each other transversely of said carriage in opening and closing motions, an actuating element carried by said carriage and reciprocable therewith and movable longitudinally with respect thereto, means drivingly connecting said element to said jaws to open and close said jaws upon relative movement of said element relative to said carriage, a first driving member connected to oscillate said element through a greater throw than said carriage, means forming an interrupted driving connection between said driving member and said carriage to oscillate said carriage at the same frequency as said element but with a lesser throw than said element, and a spring pressed detent releasably engageable between said means for driving said carriage and a fixed portion of said machine at an end of the throw of said carriage.

15. In a grading machine having an aligned series of uniformly spaced grading elements, a reciprocable carriage, opposed resiliently faced jaws mounted on said carriage for longitudinally reciprocating movement with said carriage above and along the line of the grading elements and for transverse opening and closing movement on said carriage, cam members carried by and reciprocable longitudinally of said carriage, said jaw members being provided with followers coacting with said cam members, and means for opening said jaws when the carriage is at the end of its forward stroke and closing the same when the carriage is at the end of its rear stroke and while the carriage is at rest comprising a driving gear provided with a crank and having diametrically opposed arcs of equal length without teeth, a second toothed crank gear connected to said driving gear by means of an intermediate pinion disposed to mesh with said first gear, driving connections from said carriage to said second gear including a connecting rod, and driving connections from said driving gear to said cam members including a second connecting rod.

16. In a grading machine having an aligned series of uniformly spaced grading elements, a reciprocable carriage, opposed resiliently faced jaws mounted on said carriage for longitudinal reciprocating movement with said carriage above and along the line of the grading elements and for transverse opening and closing movement on said carriage, cam members disposed adjacent and reciprocable longitudinally with respect to said carriage, said jaw members being provided with followers coacting with said cam members, and means for opening and closing said jaws when the carriage is at the ends of its stroke and while the carriage is at rest comprising a driving gear provided with a crank and having diametrically opposed arcs of equal length without teeth, a second toothed crank gear connected to said driving gear by means of an intermediate pinion disposed to mesh with said first gear, driving connections from said carriage to said second gear including a connecting rod, and driving connections from said driving gear to said cam members including a second connecting rod.

17. In a grading machine having an aligned series of uniformly spaced grading elements, a reciprocable carriage, opposed resiliently faced jaws mounted on said carriage for longitudinal reciprocating movement with said carriage above and along the line of the grading elements and for transverse opening and closing movement on said carriage, cam members connected to said carriage to reciprocate therewith, said jaw members being provided with followers coacting with said cam members, and means for opening and closing said jaws when the carriage is at the ends of its stroke and while the carriage is at rest comprising means connected to said cam members to reciprocate the same at the same rate as said carriage and through a greater throw than said carriage at each end of the throws of the carriage and the cam members.

References Cited in the file of this patent

UNITED STATES PATENTS

| Number | Name | Date |
|---|---|---|
| 766,162 | Booth | Aug. 2, 1904 |
| 1,220,922 | Winningham | Mar. 27, 1917 |
| 1,238,819 | Peters et al. | Sept. 11, 1917 |
| 1,560,373 | Birnstock | Nov. 3, 1925 |
| 1,908,843 | Hilgers | May 16, 1933 |
| 1,959,237 | Hiscock | May 15, 1934 |
| 2,003,561 | Studley et al. | June 4, 1935 |
| 2,093,338 | Niederer | Sept. 14, 1937 |
| 2,246,597 | Niederer | June 24, 1941 |
| 2,279,947 | Keen | Apr. 14, 1942 |
| 2,646,168 | Niederer et al. | July 21, 1953 |
| 2,687,802 | Davis | Aug. 31, 1954 |